United States Patent Office 2,790,204
Patented Apr. 30, 1957

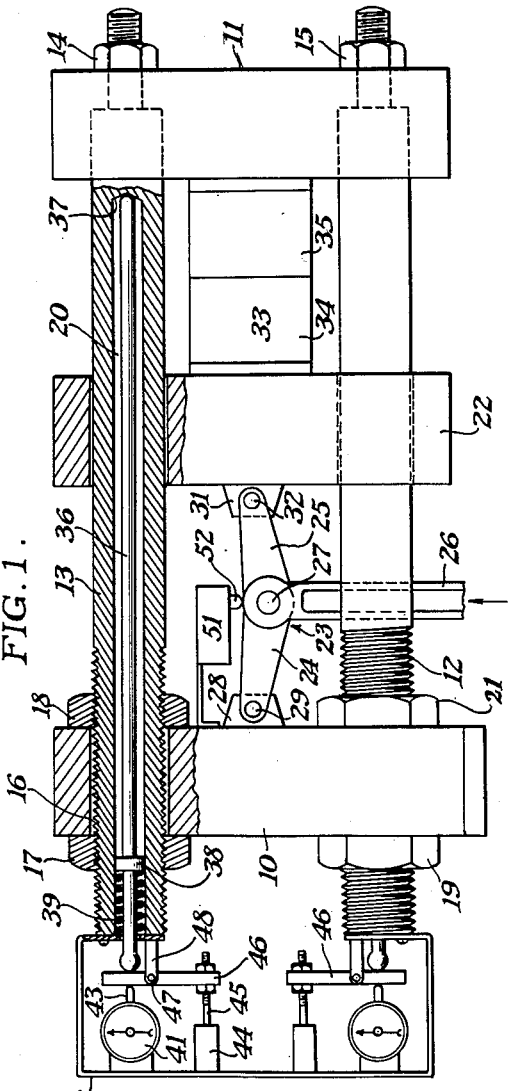

2,790,204

INJECTION MOLDING MACHINE WITH STRESS CONTROL SYSTEM

Evan A. Edwards and Lawrence A. Ulmschneider, Rochester, N. Y., assignors to Eastman Kodak Company, Rochester, N. Y., a corporation of New Jersey Application May 24, 1955, Serial No. 510,747

2 Claims. (Cl. 18—30)

This invention relates to stress indicating and regulating devices for injection molding machines and more particularly to means for presetting and regulating the closing pressures on the injection mold, and for preventing excessive pressures on the mold during operation of the injection molding machine.

Heretofore in adjusting the injection molding machine to provide optimum closing pressures on the mold, the setting nuts were adjusted to approximately the correct position to give a desired stress on the four stress rods and then by trial and error a fine adjustment was attained until the mold would close by a pressure sufficient to prevent the two halves of the mold from separating when the thermoplastic molding composition is injected therein. Insufficient pressure on the mold will permit the plastic to flash out between the two mold parts and this results in the production of undesirable molded articles. Excessive pressure on the mold is likely to damage the mold and may also result in a broken stress rod or other machine part. This adjusting process is time consuming and lacking in the accuracy which is desirable of attainment.

An object of the present invention is to provide a means for accurately indicating the stress on the stress or tie rods of the injection molding machine when setting up a mold in the molding machine.

Another object of our invention is to provide means whereby the stress on all four stress rods can be adjusted within very accurate limits.

A further object is to provide means for duplicating a previous setting of the stress rods when a particular mold is re-employed.

Another object is to provide a control system to prevent closing of the mold when a previously molded part has failed to clear itself out of the mold.

Yet another object is the stress control system which aids in the automatic operation of an injection molding machine. Other objects of our invention will appear herein.

This invention is further described in the following detailed description with reference to the drawings in which:

Fig. 1 is a side elevation partly in section of a portion of a horizontally positioned injection molding machine having the stress control device of the present invention installed thereon;

Fig. 2 is a top plan view of the molding machine shown in Fig. 1;

Fig. 3 is a view showing the electrical wiring diagram of the electric circuit for the operation of the stress control device.

Referring to Fig. 1 a portion of an injection molding machine, in sufficient detail to illustrate the features of the present invention, is shown. The molding machine comprises members 10 and 11 which are connected together by four tie or stress rods, two of which are shown at 12 and 13. The tie rods are fastened to member 11, which in effect is the stationary platen of the molding machine, by nuts 14 and 15 which engage threaded extensions of the tie rods. Member 11 is immovably mounted by means not shown to the bed of the machine which also is not shown. Member 10, however, is adjustable in a horizontal direction on the frame of the molding machine, not shown, and may be held in fixed position at any point of adjustment by means not shown.

Member 10 has four apertures therein, one of which is indicated at 16, adapted to receive the four stress rods. The stress rods have threaded portions thereon and member 10 is held in engagement with the stress rods by pairs of clamp nuts such as are shown in 17 and 18 and 19 and 21.

A movable platen 22 slidably engages the four stress rods and is movable to and fro in a horizontal direction by toggle member 23 which comprises links 24 and 25 and operating link 26 all of which are pivoted on pin 27. Link 24 is attached to member 10 by bracket 28 and pin 29, and link 25 is attached to platen 22 by bracket 31 and pin 32. Link 26 is reciprocated in a vertical direction by conventional means not shown. A conventional injection mold 33 comprising mold halves 34 and 35 is positioned in the machine. Mold part 34 is attached to movable platen 22 and mold part 35 is attached to stationary platen 11.

As is apparent from Figs. 1 and 2 when link member 26 moves downwardly, the movable platen 22 slides to the left and opens the mold and conversely when link member 26 moves upwardly to its maximum point of travel the mold is closed.

The features pertaining more directly to the present invention are now described. Referring to Fig. 1 it will be seen that stress rod 13 has a cylindrical aperture 20 extending inwardly from one end. In this aperture is positioned a tension indicating rod 36 which extends to the end of the aperture 20. Rod 36 is of lesser diameter than the diameter of aperture 20 and is supported in the center of the aperture by collar 38 which is fixed on rod 36. Rod 36 is spring pressed by spring 39 which is positioned around rod 36 and exerts pressure on the collar 38 and hence tends to move the rod into the aperture 20 and to maintain the rod in contact with the interior of tension rod 13 at 37. The other end of rod 36 extends out of the open end of the aperture in tie rod 13.

A dial indicator 41 calibrated in ten thousandths of an inch is mounted on a stationary support 42 and is actuated by the movement of member 43. A microswitch 44 is also mounted on support 42 and is actuated by reciprocating member 45. Members 43 and 45 are in turn moved inwardly and outwardly by lever arm 46 which is pivotly mounted at 47 on arm 48 which is mounted on the end of stress rod 13. The lever arm 46 is also in direct contact with tension rod 36. Therefore, lever arm 46 rocks about pivot 47 in accordance with the relative movement of tie rod 13 with respect to tension rod 36.

The general operation of the system is as folows: An increase in stress on the stress rod 13 will tend to lengthen rod 13 and move the fulcrum point 47 toward the dial 41 and switch 44. Spring 39 will hold the tension rod 36 substantially at its original position relative to a fixed point. The lever arm 46 will therefore turn in a clockwise direction depending on the relative movement of the tie rod 13 to the tension rod 36, permitting the dial indicator plunger 43 to slide to the right. At the same time the lower portion of lever arm 46 on moving to the left will push member 45 into the microswitch. When the stress on the four stress rods is lessened, the opposite action will take place at which time the dial indicator plunger 43 will be forced inwardly by the relative movement of the tie rod 36 and the tension rod 36 and the switch plunger 45 will retract out of the switch. Each of the four stress rods are provided with these various cooperating devices.

When setting up a molding machine equipped with our stress control system, the movable platen nuts are backed off and the die clamped as a unit to the stationary die plate. Movable platen is then ratcheted towards the stationary die plate to which the die is clamped, with the toggle links 24 and 25 in a straight line position. The other side of the die is then clamped to the movable platen. Adjusting nuts 17, 18, 19 and 21 are then tightened by hand, and the die opened. The adjusting nuts are then threaded in to produce the desired amount of tension. Up to this point, setting procedure follows an identical pattern, whether the machine is equipped with a stress control system or not. After threading the adjusting nuts in to obtain a desired tension, dial indicator gages are read to learn if stress is uniformly distributed over all stress rods. Discrepancies in stress distribution are noted, and by correct adjustment of the nuts, tension is apportioned over the stress rods until the desired setting is obtained.

The four microswitches are adjusted for action when there is an increase of more than .003 in. at the point of closing (this corresponds to an elongation of .0006 in. in a stress rod). Whenever stress in excess of .003 in. above selected tension occurs on closing, a microswitch closes and a solenoid valve is energized to hydraulically brake the machine's action before the die closes. This prevents damage to the machine or die.

The dial indicator reading can be translated into pounds of actual load to provide an accurate, reliable means for securing proper tie rod pressure and avoid unequal loading that was experienced when the molding machine was operated without this stress control system.

Another microswitch 51 is mounted on member 10 and its plunger 52 is actuated by movement of toggle 23. This microswitch is connected so as to open when the die is completely closed, yet no clamping force is applied. This microswitch is connected in series with the four switches on the stress rods with this combination of switches being connected with the solenoid which opens and closes the machine.

If a molded part hangs in the mold the increased stress caused by the mold pressing on this mold part will close one or more of the microswitches on the stress rods prior to the opening of the microswitch 51 adjacent the toggle. This will cause the mold to open and to keep it open without any damage.

Referring to Fig. 3 there is shown a simplified circuit for the operation of our stress system. The power source 53 is connected to double switch 54 which may be operated to open and close a circuit through wire 55 to a mold opening circuit 57, or to open and close a circuit through wire 56 to a mold closing circuit 58. The double switch 54 is moved by solenoid 59 which comprises coil 60 and armature 61. Wire 62 is connected to one side of each of microswitches 44, 64, 74 and 84. The other side of these microswitches is connected to power supply wire 53. Wire 62 is also connected to both sides of microswitch 51 and to the solenoid coil 60 which is grounded at 63. Microswitches 44, 64, 74 and 84 are normally open and microswitch 51 is normally closed. Hence, no current flows through solenoid 59 and double switch 54 remains in an open position.

However, as described above if any or all of the stress rods come under a stress greater than that set as an upper limit, one or more of the switches 44, 64, 74 and 84 will close and permit current to flow through solenoid 59 and to draw switch 54 to the left thereby closing the circuit through the mold opening circuit. The mold will therefore immediately open.

On the other hand, if no excessive stress is exerted on the stress rods, the mold will close and switch 51 will be opened thereby cutting out of the circuit switches 44, 64, 74 and 84. The plastic will then be injected into the mold in the usual way and the molding cycle continued by conventional means.

A slow down valve of known structure may be inserted in the oil circulation line, not shown, of the hydraulic system. This valve will cause the advancing mold half to deaccelerate as the advancing mold half approaches the stationary mold half. Substantially instant reversal of the moving mold half is possible when employing the control system of the present invention. A highly sensitive mold operating system is thereby attained.

We claim:

1. In an injection molding machine a fixed platen, an adjustable platen, a movable platen, a plurality of tie rods connecting said fixed and adjustable platens and slidably supporting said movable platen, means including a toggle attached to said adjustable and movable platens adapted for reciprocating said movable platen to and from said stationary platen, a longitudinal aperture closed at one end in at least one of said tie rods, a tension rod positioned centrally in said aperture and being spring pressed against the end of the aperture and having an end extending out of said aperture, an arm attached to the free end of said tie rod, a lever arm pivotly attached to said arm, a stress indicating gauge positioned to be actuated by said lever arm, a microswitch adapted to be actuated by said lever arm, electrical circuit means including said microswitch for opening the molding machine when the stress on said tie rod exceeds a predetermined amount and causes the tie rod to stretch beyond a predetermined distance relatively to said tension rod and a microswitch adapted to be actuated by said toggle and to open said electrical circuit when the mold is completely closed thereby permitting a pressure to be exerted on the mold in excess of that which otherwise would cause the mold to open.

2. The apparatus of claim 1 in which a stress control means is associated with each of the tie rods.

References Cited in the file of this patent
UNITED STATES PATENTS

| | | |
|---|---|---|
| 1,417,579 | Smith | May 30, 1922 |
| 2,498,264 | Goldhard | Feb. 21, 1950 |